Jan. 21, 1936.  V. A. KJÆR  2,028,459
DEVICE FOR REDUCING TORSIONAL VIBRATIONS IN SHAFTS
Filed May 1, 1931   5 Sheets-Sheet 2

V. A. Kjaer
INVENTOR

By Marsh Allen
ATT'YS

Jan. 21, 1936.  V. A. KJÆR  2,028,459
DEVICE FOR REDUCING TORSIONAL VIBRATIONS IN SHAFTS
Filed May 1, 1931  5 Sheets-Sheet 3

V. A. Kjaer
INVENTOR

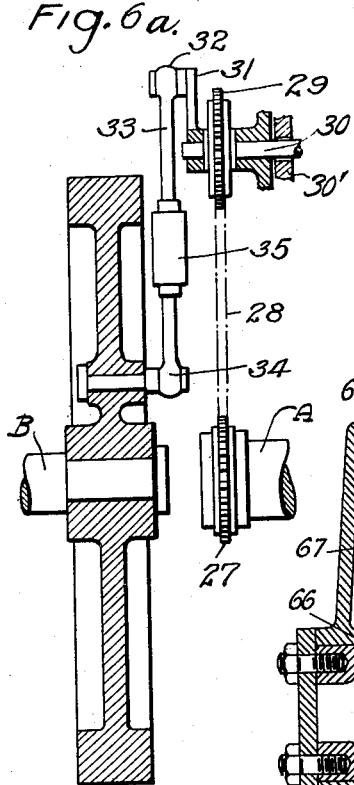

Jan. 21, 1936. V. A. KJÆR 2,028,459
DEVICE FOR REDUCING TORSIONAL VIBRATIONS IN SHAFTS
Filed May 1, 1931 5 Sheets-Sheet 5

Patented Jan. 21, 1936

2,028,459

UNITED STATES PATENT OFFICE 2,028,459

DEVICE FOR REDUCING TORSIONAL VIBRATIONS IN SHAFTS

Viggo Axel Kjær, Copenhagen, Denmark

Application May 1, 1931, Serial No. 534,385
In Denmark May 26, 1930

7 Claims. (Cl. 74—574)

Figure 1:
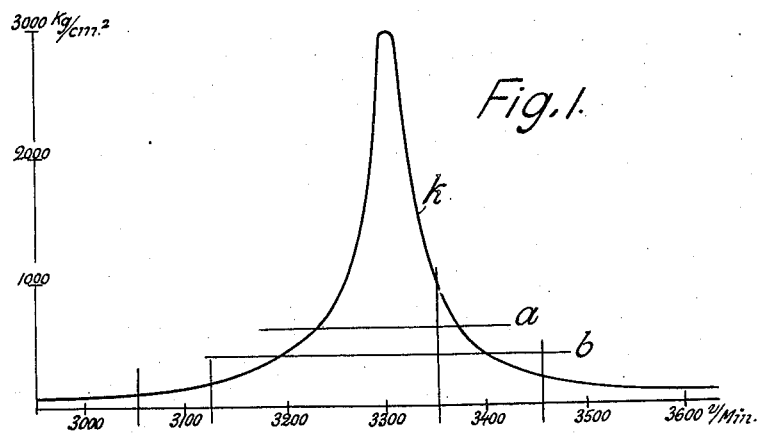
Figure 2:
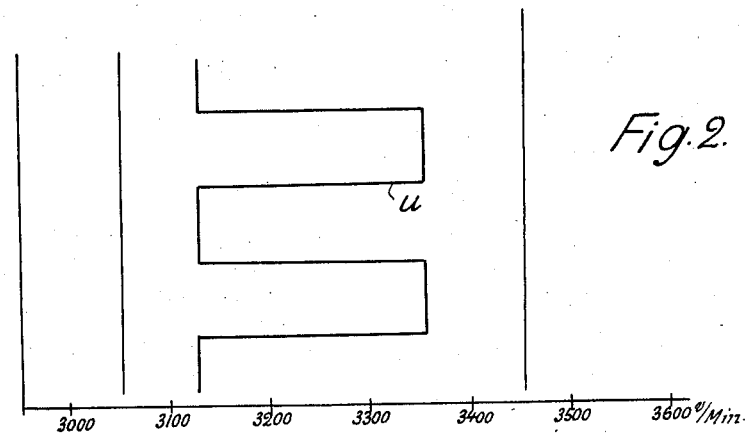
Figure 3:
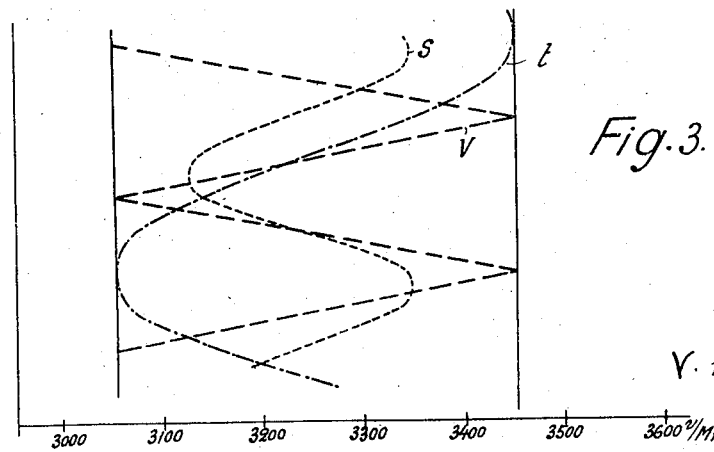
Figure 4:
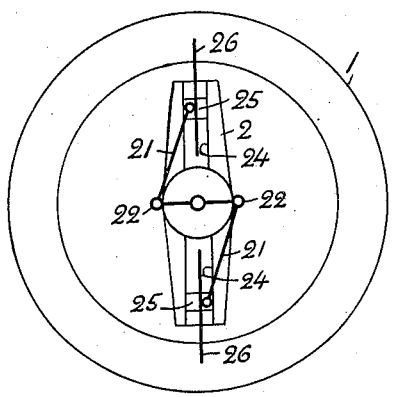
Figure 5:
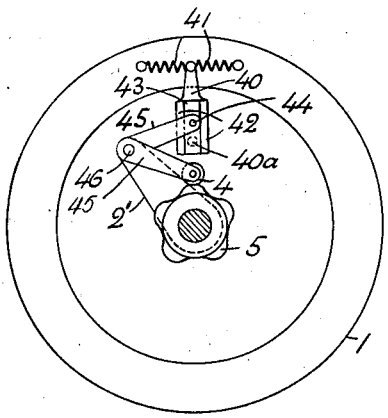
Figure 6:
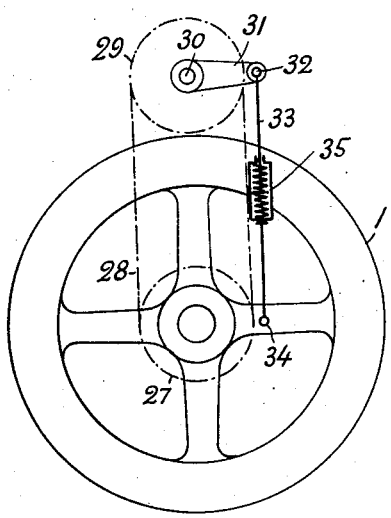
Figure 7:
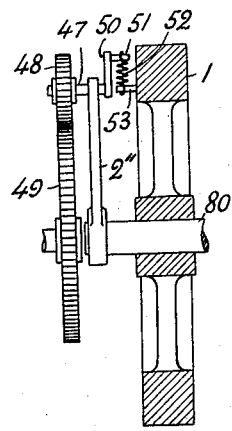
Figure 8:
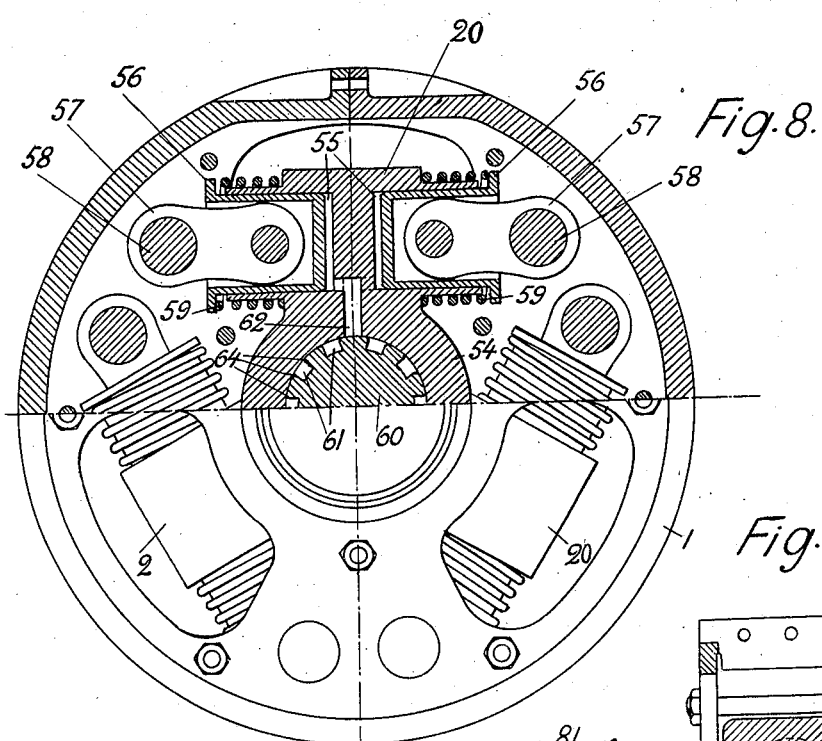
Figure 4A:
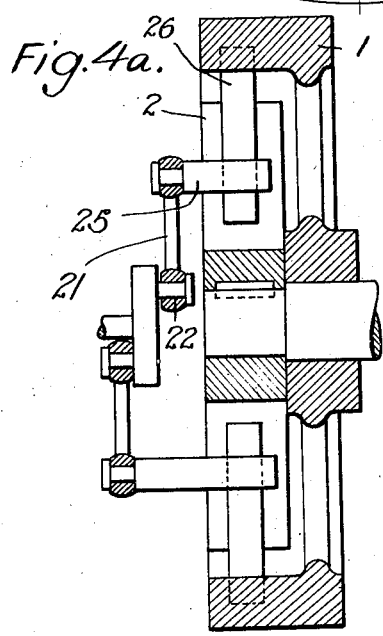
Figure 9:
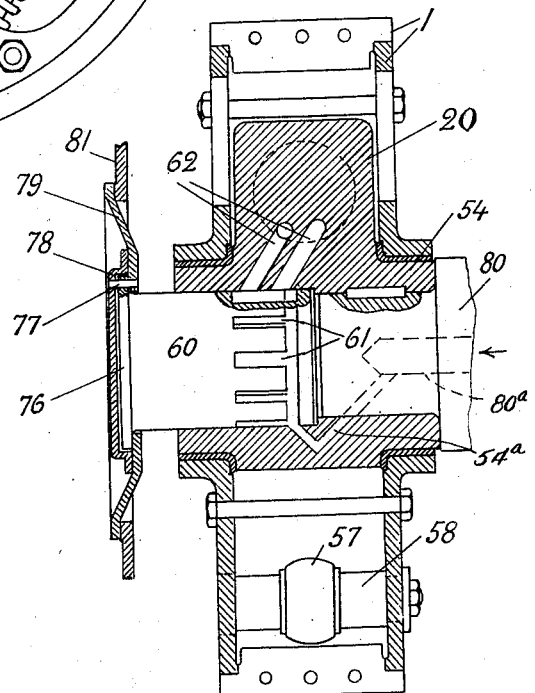
Figure 10:
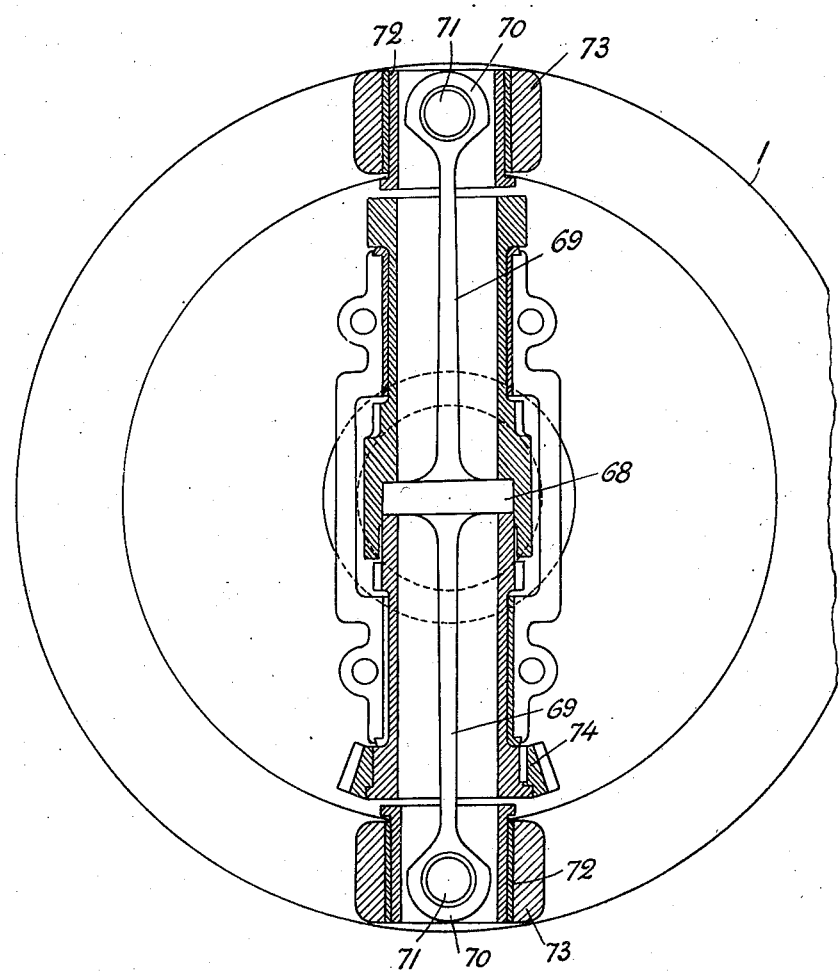

The invention relates to a device for reducing or minimizing the cumulative effect of torsional vibrations in shafts, particularly the crankshafts of internal combustion engines. In order to avoid critical torsional vibrations in shafts, damping devices have been used consisting, for example, of engine parts the torsional vibrations of which are caused to do work, that is, to traverse a certain path while overcoming a resistance such as, for example, friction, fluid pressure, or the like. These known devices suffer however from various drawbacks; they are in general of very complicated construction, so that they are costly to manufacture, or their action is such that the mechanical efficiency of the engine as a whole is poor, because the devices consume part of the power applied to the crankshaft, which is thus not usefully employed. Moreover, the damping attained is in many cases insufficient, because the damping effect depends upon the work done, the conditions being such that a vibration effort of a certain degree must be carried out in order to cause the damping action. Minimization of the vibration effort to nil by these known devices was therefore practically impossible. The present invention is based on quite different principles from the above-mentioned known devices, being based on the fact that critical torsional vibrations only occur when resonance or approximate resonance exists between the natural frequency of vibration of the rotating shaft and its speed. According to the invention therefore provision is made for ensuring that the shaft during its rotation has no fixed natural frequency of vibration, but that the same constantly varies. The invention consists in the employment of inertia masses which are so connected to the shaft that the stiffness or elasticity of the connection and thereby the contribution of the masses to the natural frequency of the shaft's vibration varies continuously and periodically during the rotation of the shaft. Devices are known in which a flywheel is intermittently connected to its shaft and also devices having flywheels provided with weights, the radial positions of which are varied during the rotation. According to the invention the stiffness or elasticity of the connection between the shaft and the inertia masses is as stated, altered during the rotation of the shaft and this arrangement makes it possible to obtain in a simple and effective manner that the natural frequency of vibration of the shaft fluctuates continuously and periodically between two predetermined limits. The invention thus ensures that the shaft will have no fixed natural frequency of vibration and that it will never run with natural frequencies of vibration which are in harmony with its speed, except for very short interrupted periods. By changing the natural frequency of vibration, the torsional vibrations will never reach their maximum, so that the shaft will not be subjected to such critical additional strains as would be the case if constant resonance existed. The amplitudes of the vibrations on the contrary will lie between the minimum and maximum amplitude of the range of frequencies of vibration within which the natural frequency of vibration of the shaft fluctuates. According to the invention, the shaft and the inertia masses may, for instance, be connected through a rod and crank system, which periodically comes into dead-point positions and which contains an elastic or springy member. Or a springy device, the elasticity or stiffness of which is varying, may be inserted between the shaft and the inertia masses. The connection between the shaft and the inertia masses may be varied, for example, in such a manner that the variations of the natural frequency of vibration of the shaft follow a sinusoidal or similarly shaped curve, or in such a manner that the variations follow a curve composed of straight lines. Various constructional forms of the invention will be apparent from the accompanying drawings and following description. Figs. 1, 2, and 3 of the drawings show diagrams of additional strains resulting from the torsional vibrations of a crankshaft. Figs. 4 to 7 show diagrammatically four different constructions according to the invention. Figs. 4a, 5a, and 6a are vertical central sectional views of the several constructional forms of the invention illustrated in Figs. 4, 5, and 6, respectively. Figs. 8 and 9 are two sections at right angles to each other through a fifth construction, and Figs. 10 and 11 are similar sections through a sixth constructional form. Suppposing the shaft rotates at a constant speed, the variation of torque causes vibrations in the shaft. The magnitude of the vibrations depends upon the relationship between the natural frequency of the shaft and the period of torque variation. The additional strains in the shaft thus also depend upon said relationship. The greatest strains occur when the torque variations synchronize with the natural frequency of the shaft. For the theoretical case of a shaft without damping the maximum of stress is infinite, but in the case of a crank shaft for a reciprocating engine, the damping effect of mechanical friction reduces the maximum stress to a finite value. Usually the case under consideration is that of a shaft with a given natural frequency, which is submittted to a torque, the period of which varies. In opposition hereto I consider a shaft, the natural frequency of which, according to my invention, is continuously varied, whereas the period of torque variation, or the revolutions of engine are maintained constant. Accordingly the natural frequencies of vibration of the shaft are taken as abcissa in Fig. 1, whilst the strains corresponding to a fixed number of revolutions of engine in combination with the different values of natural frequency are erected as ordinates, whereby a curve $k$ is obtained. The curve is shown for natural frequencies between say 3000 and 3600 vibrations per minute. The torsional strains are maximum for a natural frequency of 3300, by which frequency resonance occurs. According to the figure, the value of the maximum strains is about 3000 kilos per cm². It will be assumed that variable inertia masses are so fitted to the shaft according to this invention that the natural frequency may vary between 3,125 and 3,350. The natural frequency 3,125 corresponds according to curve $k$ to a maximum additional strain of about 200 kgs. per cm², whilst the additional strain with a natural frequency of 3,350 is about 900 kgs. per cm². If the natural frequency varies during the rotation of the shaft, for example according to the sinusoidal curve $s$ in Fig. 3—in which the ordinates are in seconds while the abcissa are the same as in Fig. 1—the additional strains in the shaft attain a mean value which is shown in Fig. 1 by the horizontal line $a$, i. e. about 600 kgs. per cm² such average value being obtained from a stress-time curve obtained jointly from Figs. 1 and 3. If the natural frequency is allowed to vary over a wider range, e. g. between 3050 and 3450 vibrations per minute, i. e. if the vibrations vary during the shaft rotation in accordance with the sinusoidal curve $t$ in Fig 3, the additional strains attain a mean value of about 400 kgs. per cm² corresponding to the horizontal line $b$ in Fig. 1. The curve $u$ in Fig. 2 corresponds to such known devices by which inertia masses are alternately and suddenly coupled to and uncoupled from the shaft. The shaft then runs alternately at natural frequencies of 3125 and 3350, the transition from one to the other occurring suddenly. By varying the natural frequency of vibration in this manner, the effect is produced of the shaft running at each of the two limits of frequency for periods of a certain limited duration, so that the period is sufficient for the amplitude of the inertia masses to attain high values, particularly if one of the limits of frequency is in or near a point of resonance. Variation of the natural frequency according to a curve such as curve $u$ in Fig. 2 may thus in some cases result in certain drawbacks. According to the invention the natural frequency can however, also advantageously be varied according to a curve which consists of a series of straight lines, when these lines are zig-zig formed, e. g. as shown in the curve $v$ in Fig. 3, in which case there is no period of limited duration during which the shaft runs with a predetermined natural frequency. In the construction according to Figs. 4 and 4a the inertia masses constituted by a flywheel 1 which is rotatable upon the shaft upon which an arm 2 is keyed. The arm 2 is provided with slideways 24 in which slide blocks 25 are movable. The slide blocks have radial recesses in which blade springs 26 can slide, their outer ends being fastened to the rim of the flywheel. The slide blocks 25 are connected by links 21 to stationary cranks 22 fitted beyond the shaft. During the rotation of the shaft the links rotate about the cranks 22, whereby the slide blocks 25 are moved to and fro in the slides 24. The flywheel 1 rotates with the shaft, the motion being transmitted by the blade springs 26, but owing to the reciprocatory movement of the slide blocks 25, the length of the portion of the blade springs which transmits the rotation constantly varies so that the rigidity of the connection between the shaft and the flywheel also constantly varies during the rotation. This variation corresponds in relation to the shaft to a constantly varying elongation or contraction of the shaft with the resulting variations of its natural frequency of vibration. Figs. 5 and 5a show a construction wherein the outer ends of two springs 41 are fixed to the flywheel 1 rotatably fitted on the shaft, one end of an arm 40 being held firmly between the two inner ends of the springs. The other end of the arm 40 is pivoted on the flywheel 1 on a pin 40a. The arm 40 has slides 42 between which a slide block 43 is movable. The slide block 43 is pivotally connected by means of a pin 44 to a bell-crank 45, which is pivoted on a pin 46 on the arm 2' keyed on the shaft. The bell crank 45 also carries a roller 4 which engages with a stationary cam 5. The arrangement works in a similar manner to that described with reference to Fig. 4, the motion being transmitted from the shaft to the flywheel through the arm 2, bell crank 45, slide block 43, arm 40 and the springs 41, and the pressure of the springs 41 will be greater or less according to the position of the slide block 43. In the construction according to Figs. 6 and 6a the chain wheel 27 is keyed upon the main shaft A, while the flywheel 1 is rotatable on a tap or shaft B, which may be stationary and which is in alignment with the shaft A, the shaft 30 being in turn supported at its right end in a bearing 30'. The chain wheel 27 drives a countershaft 30 through an endless chain 28 and a chain wheel 29. On the shaft 30 is keyed an arm 31 with a crank pin 32 which is connected by a rod 33 to a crank pin 34 fixed on the flywheel 1. The radii of the two crank pins 32 and 34 are parallel and of equal length. A spring element 35 is fitted on the rod 33. This connection acts as a variable coupling, because the angular position of the spring link in relation to the radius of the cranks varies during the rotation of the shaft so that the flywheel is alternately put into and out of gear with a smooth action. In the position shown on the drawing the flywheel is fully coupled to the countershaft 30 so that it completely follows the movement of the countershaft. In a position of the cranks at 90° to the position illustrated the flywheel is not coupled to the countershaft 30, because the latter in this position can describe small movements from the aforesaid position which are not transmitted to the flywheel. The coupling of the shaft and flywheel together and their uncoupling take place smoothly as already stated, so that the natural frequency of vibration varies according to a continuous curve through values lying between the two limiting values. The construction according to Fig. 7 is similar to that of Figs. 6 and 6a. On the shaft 80 is keyed an arm 2'', the outer end of which forms a bearing for a shaft 47. The latter carries at one end a pinion 48 which meshes with a gear wheel 49 concentric with the shaft 80 but stationarily fitted beyond the end thereof. The other end of the shaft 47 carries a crank 50 having a pin 51 which is connected by means of a spring 52 with a pin 53 on the flywheel 1 loosely fitted on the shaft 80. When the shaft 80 rotates, it carries with it the arm 2" and the pinion 48 rolls on the stationary gear wheel 49, whereby the crank 50 is set in rotation. The spring 52 is thus caused, during the rotation of the shaft, to assume every possible angular position in relation to the radius of the pin 53. In positions where the axis of the spring 52 is in line with the radius of the flywheel to the pin 53, substantially no movement of the arm 2" relative the flywheel can take place, whereas the flywheel is resiliently coupled to the arm in those positions where the spring 52 is at right angles to the said radius. The flywheel is thus coupled and uncoupled several times for every revolution of the shaft, but a gradual transition from the completely coupled to the completely uncoupled condition takes place and the natural frequency of vibration therefore varies according to a continuous curve. In the construction according to Figs. 8 and 9 the flywheel 1 is freely rotatable upon a sleeve 54 keyed to the shaft 80 (Fig. 9). Three double cylinders 20 are cast integrally with the sleeve 54 and pistons 56 with connecting rods 57 are adapted to work therein. The rods 57 are mounted on cross pins 58 in the flywheel, and resilient connection between the flywheel and the shaft is established by means of springs 59 fitted between shoulders on the pistons 56 and on the cylinders 20. Another connection of hydraulic nature between the flywheel and the shaft is established in the following manner. A plunger 60 is located in the central bore of the sleeve 54 and rigidly connected to the cover 78, 79 of the flywheel house 81 by means of collar 76 and plugs 77. Along the periphery of the plunger a number of pockets 61 are provided. Passages 62 lead from the inner spaces 55 of the cylinders 20 to the central bore of the sleeve 54, so that each pair of passages 62 may communicate through the pockets 61, see Fig. 9. The side edges 64 of the pockets 61 are rounded off so as to gradually establish and gradually cut off the communication between the pockets and the passages 62 during the revolution of the shaft 80. A liquid such as oil is contained in the cylinder spaces 55, passages 62 and pockets 61, the sleeve 54 and the shaft 80 having bores 54ᵃ and 80ᵃ, respectively, for supplying liquid for maintaining the passages filled with liquid. The sleeve 54 and cylinders 20 rotate with the shaft. When the sleeve 54 is in the position shown in Fig. 8 relative to the pocket 61 of the stationary plunger 60 the shaft 80 is rigidly coupled to the flywheel 1, the liquid being trapped in the cylinders so as to act as a rigid coupling between the cylinders 20 and the pistons 56. When the shaft turns out of the described position, communication between the cylinder spaces 55 is gradually established owing to the rounded edges 64, and when the communication between the passages 62 is at maximum the flywheel is connected to the shaft only by means of the spring coupling 54 and 56—59. On further rotation of the shaft the communication between the cylinders is gradually throttled and finally completely closed. In this manner the flywheel 1 is connected to the shaft 80 by a coupling, whose stiffness varies continuously and periodically with the rotation of shaft, said stiffness varying from a value corresponding to a fully rigid hydraulic coupling to another value depending on the stiffness of the springs 59. In connection with the foregoing it is also to be noted that periodically during rotation one cylinder space 55 of each pair of double cylinders 56, 56 is connected by the passages 62 and a pocket 61 in the sleeve 60 to the other cylinder space 55 of the same pair of double cylinders. In the form according to Figs. 10 and 11 the flywheel 1 is likewise rotatable upon the hub 54 of an arm 2‴ keyed to the shaft 80. The arm 2‴ has a bearing 67 for a cylinder 65 which consists of two parts screwed together by providing the two opposed ends which fit into one another with screw threads 66. By screwing the two parts of the cylinder 65 together, a collar 68 formed at the centre of a blade spring 69 is clamped between the end of one cylinder part and a shoulder on the other cylinder part. The blade spring 69 has an eye 70 at each end, these eyes being fixed by means of bolts 71 in bushes 72 which are rotatable in bearings 73 in the flywheel 1. The cylinder 65 has at one end a bevel pinion 74 engaging with a fixed bevel pinion 75 coaxial with the shaft 80. During revolution of the shaft the arm 2 and cylinder 65 revolve therewith and owing to the connection of the flywheel 1 to the shaft 80 through the blade spring 69, the rotation is transmitted to the flywheel 1. During rotation of the shaft 80 the bevel pinion 74 rolls on the bevel pinion 75 which does not take part in the rotation, and thus the cylinder 65 is set in rotation about its axis. Consequently the blade spring is sometimes parallel and sometimes perpendicular to the plane of rotation of the flywheel 1, so that the motion is transmitted alternately by a rigid member, when the blade spring is parallel to the plane of rotation, and by a resilient spring member when the blade spring is at right angles to the plane of rotation, and between these two limiting conditions there is a gradual transition so that the natural vibration frequency of the shaft varies smoothly between two limiting values, passing during each revolution through the intermediate values a certain number of times depending on the ratio of the bevel gearing. The invention is not limited to the constructions illustrated and described, but may be carried out in other ways without departing from the principles of the invention.

I claim:

1. A device of the character described, comprising in combination a rotatable shaft which is subject to torsional vibration, a sleeve keyed on said shaft, an inertia mass comprising a flywheel rotatably fitted on said sleeve, double cylinders rigidly connected to said sleeve and having their axes substantially perpendicular to the shaft, pistons in said cylinders, cross pins secured to the flywheel, rods pivotally connecting said pistons with said cross pins, a springy connection between said pistons and said cylinders, a fluid contained in the cylinder spaces, channels for connecting the cylinder spaces of the two cylinders in each double cylinder and means for periodically and continuously alternately establishing and cutting off the communication between said cylinder spaces through said channels during the rotation of the shaft.

2. A device of the character described, comprising in combination a rotatable shaft which is subject to torsional vibration, a sleeve keyed on said shaft, an inertia mass comprising a flywheel rotatably fitted on said sleeve, double cylinders rigidly connected to said sleeve and having their axes substantially perpendicular to the shaft, pistons in said cylinders, cross pins secured to the flywheel, rods pivotally connecting said pistons with said cross pins, shoulders on the pistons and on the cylinders, helical springs inserted between each pair of said shoulders, a fluid contained in the cylinder spaces, channels for connecting the cylinder spaces of the two cylinders in each double cylinder, and means for periodically and continuously alternately establishing and cutting off the communication between said cylinder spaces through said channels during the rotation of the shaft.

3. A device of the character described, comprising in combination a rotatable shaft which is subject to torsional vibration, a sleeve keyed on said shaft, an inertia mass comprising a flywheel rotatably fitted on said sleeve, double cylinders rigidly connected to said sleeve and having their axes substantially perpendicular to the shaft, pistons in said cylinders, cross pins secured to the flywheel rods pivotally connecting said pistons with said cross pins, a springy connection between said pistons and said cylinders, a fluid contained in the cylinder spaces, a central bore in the sleeve opposite the end keyed on the shaft, a plunger located in said central bore, means for keeping said plunger in a fixed position, substantially axially extending grooves in the cylindrical surface of said plunger, a channel passing from each of the cylinder spaces to the bore of the sleeve, the two channels from the two cylinder spaces in each double cylinder opening in the said bore at points lying substantially axially behind each other and within the grooved part of the said plunger, said grooved plunger part serving for alternately establishing and cutting off the communication between said channels and therewith between said cylinder spaces during the rotation of the shaft.

4. A device as claimed in claim 3 in which the side edges of the grooves in the said plunger are rounded off so as to gradually establish and gradually cut off the communication between the said channels during the rotation of the shaft.

5. A device of the character described, comprising in combination a rotatable shaft which is subject to torsional vibration, an inertia mass, an elastic connection between said mass and said shaft, said connection having a continuously variable degree of elasticity so as to avoid sharp and sudden alterations and insure gradual and smooth transitions, and means connected with the shaft and operated by the rotation of the same to influence said connection, so that the degree of elasticity of the connection is varied continuously and periodically with gradual transitions during the rotation of the shaft.

6. A device of the character described, comprising in combination a rotatable shaft which is subject to torsional vibration, an inertia mass loosely fitted on said shaft, an elastic connection between said mass and said shaft, said connection having a continuously variable degree of elasticity so as to avoid sharp and sudden alterations and insure gradual and smooth transitions, and means connected with the shaft and operated by the rotation of the same to influence said connection, so that the degree of elasticity of the connection is varied continuously and periodically with gradual transitions during the rotation of the shaft.

7. A device of the character described, comprising in combination a rotatable shaft which is subject to torsional vibration, an inertia mass connected to said shaft, said mass comprising a flywheel rotatably fitted on the shaft, a fluid coupling combined with springs for connecting the shaft and the flywheel, said coupling having a continuously variable degree of elasticity so as to avoid sharp and sudden alterations and insure gradual and smooth transitions, and means connected with the shaft and operated by the rotation of the same to influence said connection, so that the degree of elasticity of the connection is varied continuously and periodically with gradual transitions during the rotation of the shaft.

VIGGO A. KJÆR.